United States Patent [19]
Leddy et al.

[11] 3,929,506
[45] Dec. 30, 1975

[54] ZINC-BROMIDE SECONDARY CELL

[75] Inventors: James J. Leddy; Gerhard Gritzner, both of Midland, Mich.

[73] Assignee: The Dow Chemical Company, Midland, Mich.

[22] Filed: May 18, 1973

[21] Appl. No.: 361,745

[52] U.S. Cl................................ 136/86 A; 136/30
[51] Int. Cl.²...................................... H01M 4/86
[58] Field of Search ............... 136/86 A, 30, 93, 95

[56] References Cited
UNITED STATES PATENTS

| | | | |
|---|---|---|---|
| 3,214,296 | 10/1965 | Smatko | 136/86 A |
| 3,607,417 | 9/1971 | McRae | 136/86 |
| 3,642,538 | 2/1972 | Zito | 136/30 |

FOREIGN PATENTS OR APPLICATIONS

| | | | |
|---|---|---|---|
| 867,479 | 3/1971 | Canada | 136/86 A |

Primary Examiner—John H. Mack
Assistant Examiner—H. A. Feeley
Attorney, Agent, or Firm—R. W. Selby

[57] ABSTRACT

A zinc-bromine secondary cell is divided into two compartments by an ion exchange diaphragm. The electrolyte system includes an essentially bromide ion free, aqueous solution containing a zinc ion as an anolyte and a bromide ion containing catholyte. A method of operating the cell is disclosed.

16 Claims, 2 Drawing Figures

ZINC-BROMIDE SECONDARY CELL

BACKGROUND OF THE INVENTION

This invention pertains to a zinc-bromine electrolytic cell and more in particular to an improved zinc-bromine electrolytic cell having an ion exchange diaphragm positioned between the anode and the cathode.

Zinc-bromine electrolytic cells, e.g. storage or secondary cells, have long been known, but as a result of difficulties, such as short shelf-life, have not generally been employed. The short shelf-life, i.e., self-discharge of an aqueous zinc-bromine cell, is believed to be the result of the dissolution of the zinc electrode in the electrolyte prior to useful electrical discharge of the cell. A satisfactory means of suppressing the self-discharge of a zinc-bromine cell has heretofore not been developed sufficiently to induce general usage of this type electrolytic cell.

SUMMARY OF THE INVENTION

The hereinafter described invention provides a zinc-bromine secondary cell suitable for use as a battery with a longer shelf-life than had been heretofore possible. The zinc-bromine secondary cell comprises in combination an at least partially cell-encasing body having therein an anode compartment and a cathode compartment. A first electrode is positioned within the anode compartment and is spaced apart from a second electrode positioned in the cathode compartment by an ion exchange diaphragm. The ion exchange diaphragm is of the cationic type suitable to minimize passage of anions such as a bromide ion from the cathode compartment into the anode compartment. The ion exchange diaphragm further substantially entirely separates the anode compartment from the cathode compartment.

The secondary cell further includes an electrolyte system which at least at the time of initial operation of the cell consists essentially of an aqueous solution of a bromide ion disposed in the cathode compartment and an essentially bromide ion free, aqueous solution of a zinc cation disposed in the anode compartment.

Operation of the cell includes adding the electrolyte system to the respective anode and cathode compartments to at least partially immerse the electrodes in the respective solutions. An electromotive force is then impressed between the anode and the cathode to deposit metallic zinc on the anode and to release bromine at the cathode. During release of the bromine at the cathode substantially only cations will pass through the diaphragm into the anode compartment to thereby maintain the solution in the anode compartment in an essentially bromine free condition.

At least partially as a result of the absence of bromide ion in the anode compartment the described secondary cell has an improved shelf-life in comparison to non-diaphragm zinc-bromine secondary cells having a single bromide ion containing electrolyte. The described cell can be discharged and utilized in a manner familiar to those skilled in the art.

DESCRIPTION OF THE DRAWING

The accompanying drawing further illustrates the invention.

Identical numerals, distinguished by a letter suffix, within the several figures represent parts having a similar function within the different embodiments.

DESCRIPTION OF THE PREFERRED EMBODIMENTS

Figure 1:
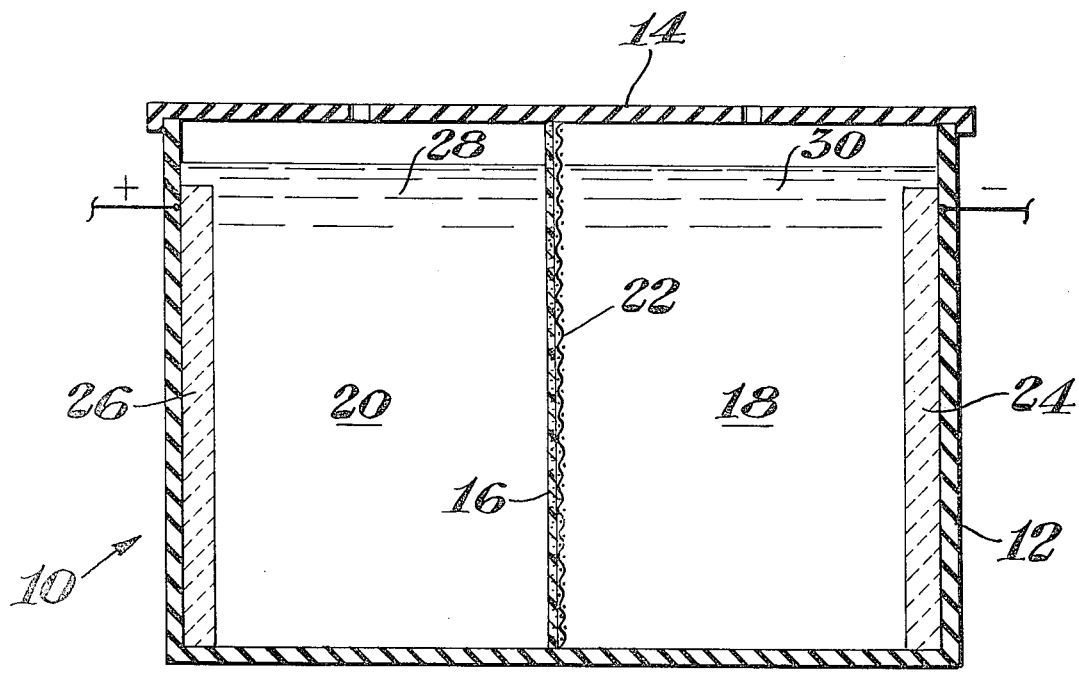
In FIG. 1 is depicted a cross sectional view of one embodiment of a zinc-bromine secondary cell of the invention.

Referring now to the drawing, there is shown in FIG. 1 an electrolytic cell 10 having an encasing body or a fluid tight container 12 with a cover 14 enclosing substantially all of the open end of the container 12. Both the container 12 and the cover 14 are preferably constructed of an electrically insulating material which is not subject to chemical or physical attack or reaction with electrolytic cell fluids retained by the container 12.

A cation exchange membrane or diaphragm 16 is adapted to divide the inner portion of the container 12 into an anode compartment 18 and a cathode compartment 20. Cation exchange membranes are well-known to contain fixed anionic groups that permit intrusion and exchange of cations, and exclude anions, from an external source. Generally the resinous membrane or diaphragm has as a matrix a cross-linked polymer, to which are attached charged radicals such as $-SO_3^-$, $-COO^-$, $-PO_3^=$, $-HPO_2^-$, $-AsO_3^=$ and $-SeO_3^-$. Vinyl addition polymers and condensation polymers may be employed. The polymer can be, for example, styrene, divinylbenzene, polyethylene and fluorocarbon. Condensation polymers are, for example, phenol sulfuric acid and formaldehyde resins. A method of preparing such resinous materials is described in U.S. Pat.No. 3,282,875. The cation exchange diaphragm 16 can be physically strengthened or retained in a substantially rigid position by use of a support member, such as screen 22, juxtaposed at at least one surface of the diaphragm 16. Optionally, the support member can be encased within the diaphragm. The diaphragm can be partially in physical contact with either the anode or the cathode or can be a free standing diaphragm optionally supported on at least one side by the support screen 22 formed from a material chemically and physically resistant to the respective electrolyte. For example, polypropylene, polyethylene, chlorinated polyvinyl chloride, polyesters, polytetrafluoroethylene, epoxy resins and glass fibers are resistant to the anolyte and catholyte.

An anode 24 is suitably positioned within the anode compartment 18 to permit electrically joining or connecting the anode 24 with a power source (not shown). The anode 24 is preferably a plate-like configuration suitable for the deposition of metallic zinc thereon. The anode 24 is desirably formed from a material such as, for example, impervious or porous carbon or graphite, zinc and metals and alloys more noble than zinc, i.e., those metals which are less readily oxidized than zinc, such as Cr, Fe, Co, Ni, gold, silver and platinum and other metals plated with such noble metals. Preferably the anode is carbon, graphite, iron, nickel, or zinc. Although the anode 24 can be formed of any solid material, which is physically and chemically resistant to an electrolyte within the anode compartment 18, it is highly preferred that it be carbon or graphite.

In a like manner a cathode 26 is suitably positioned within the cathode compartment 20 of the cell for battery 10. The cathode is a plate-like configuration or shape made of a solid material chemically and physically resistant to the reactive and corrosive effects of bromine and the bromide ion. Preferably the cathode 26 is made of impervious or porous carbon, a metal such as platinum group metal, or a composite of, for example, titanium or tantalum coated with a platinum group metal.

More preferably the cathode is porous carbon. The cathode 26 is adapted to be electrically joined to a source of direct electric current (not shown).

The electrolyte system is divided into two electrolyte portions. The first electrolyte portion or catholyte 28 is disposed in the cathode compartment 20 in a sufficient amount to entirely immerse or cover the cathode 26. The catholyte is an aqueous solution containing a bromide ion of, for example, a salt such as an alkali bromide (such as LiBr, NaBr or KBr), alkaline earth metal bromide (such as $BeBr_2$, $MgBr_2$, $CaBr_2$ and $SrBr_2$), $NH_4Br$, tetraalkylammonium bromides, tetraarylammonium bromides and other stable ionizable bromides. Sufficient bromide salt is employed to permit retention of an electrolytic charge in the cell. Preferably the molar concentration of bromide ion in the catholyte is from about one to substantially complete saturation of the aqueous catholyte and preferably at least about four. Mixtures of various bromide salts are satisfactory; however, an aqueous solution of lithium bromide is preferred.

The second electrolyte portion or anolyte 30 is disposed in the anode compartment 18. To obtain improved shelf-life of the electrolytic cell 10 the anolyte 30 is essentially free of bromide ion. By essentially free is meant that substantially the only bromide ion present in the anolyte 30 is a result of undesired leakage of bromide ion from the catholyte 28 through the diaphragm 16 into the anolyte 30 or was present as an impurity in the orginal anolyte. Preferably the diaphragm is such that substantially no bromide ion passes therethrough into the anolyte 30. The anolyte is an aqueous solution containing at least about two moles zinc ion. The zinc ion is provided from a zinc containing salt such as $ZnClO_3)_2.4H_2O$, $ZnCl_2$, $ZnI_2$, $Zn(BF_4)_2$, $ZnSiF_6.6H_2O$, $Zn(NO_3)_2.3H_2O$, $Zn(NO_3)_2.6H_2O$. To even further reduce the formation of the dendrites on the anode it is preferable that the anolyte contain a mixture of a zinc cation and a tetrafluoroborate anion. The anolyte preferably contains at least about one weight per cent $Bf_4^-$ ion. The anolyte electrical conductivity can be increased by the addition of a chloride ion such as an alkali chloride (e.g. LiCl, NaCl and KCl) and more preferably LiCl.

The general composition of the electrolyte system is based on the electrolyte system of the completely discharged cell. Naturally the electrolyte composition will change as the cell of a battery is charged and discharged during use.

In addition to the salts generally employed in the electrolyte system it may be advantageous to add to the anolyte up to about five and preferably one gram per liter of a surfactant. Although the presence of the fluoroborate ion and the absence of the bromide ion in the anolyte substantially reduces the formation of dendrites on the anode, a small quantity of a surfactant will assist in further reduction of dendrite formation. It may also be desirable to add a suitable gelling agent to the electrolyte system. Such gelling agents are known to those skilled in the art.

Figure 2:
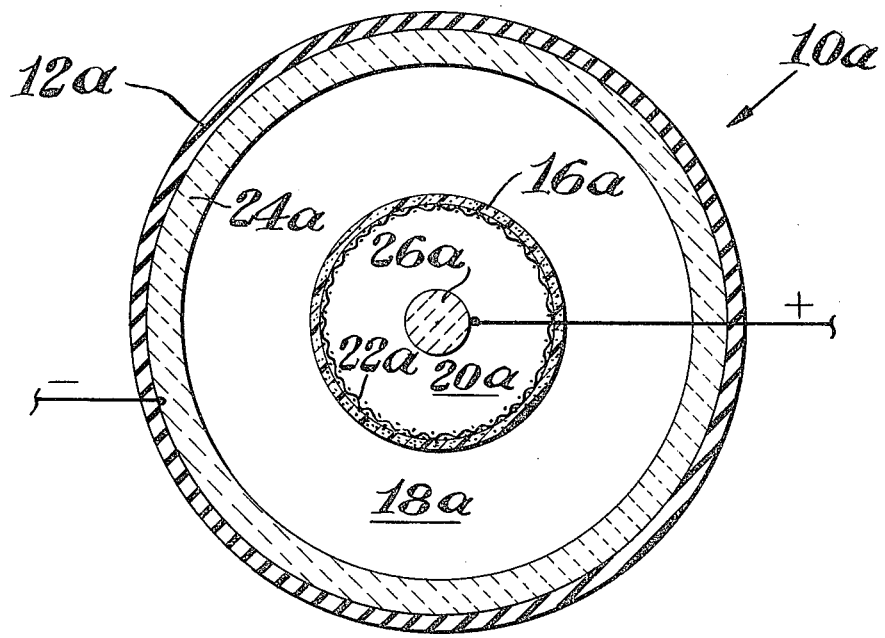
In FIG. 2 is a cross sectional view of another embodiment of the invention.

In FIG. 2 is a cross sectional view of a cylindrical zinc-bromide cell 10a having an electrically insulating, i.e., nonconducting, container or casing 12a, circumferentially surrounding an anode 24a. A cathode 26a is axially spaced apart from the anode 24a by an ion exchange diaphragm 16a supported on the cathode side by a suitable foraminous supporting member such as a porous sheet or screen 22a. Anolyte (not shown) is disposed in an anode compartment 18a and is prevented from entering and mixing with catholyte (not shown) disposed in a cathode compartment 20a by the diaphragm 16a.

In operating the above described zinc-bromine secondary diaphragm cell, the catholyte is added to the cathode compartment 20a and the anolyte is added to the anode compartment 18a by suitable means known to those skilled in the art. The electrolytic cell can be either sealed from the atmosphere or vented to permit exit of gases or liquid from the cathode and anode compartments. An electromotive force (direct current) is impressed between the anode 24a and cathode 26a to deposit metallic zinc onto the anode 24a from the anolyte. Simultaneously bromine is released at the cathode 26a, usually as a liquid, and cations present in the catholyte pass through the ion selective ion exchange diaphragm 16a from the cathode compartment 20a into the anode compartment 18a. Preferably the bromide ions remain in the cathode compartment 20a and substantially only the cations enter the anolyte. Deposition of metallic zinc onto the anode 24a is continued until the battery is charged a desired amount. Discharge of the battery is carried out by means known to those skilled in the art.

The acidity (pH) of the anolyte portion of the starting or discharged anolyte system is adjusted to below that acidity at which substantially all of the zinc ion precipitates as zinc hydroxide, preferably within the range of from about 0.5 to about 5 and more preferably within the range of from about 3 to about 4. The pH can be adjusted by adding a base such as lithium hydroxide, sodium hydroxide, potassium hydroxide and ammonium hydroxide or zinc powder to the anolyte. Preferably the pH adjustment is carried out by adding lithium hydroxide to the anolyte. Generally the anolyte is filtered to remove solid particulate before addition to the anode compartment.

The following examples further illustrate the invention.

EXAMPLES 1–38

An aqueous electrolyte system was prepared having the compositions shown in Table I. The electrolyte was generally filtered and then added to an electrolytic cell similar to that shown in FIG. 1. Porous carbon electrodes or a porous carbon anode and a metallic zinc cathode (see Table II) with surface areas of 2.4, 6 or 8 square inches were spaced about 0.2, 0.25 or 1 inch apart by a duPont Nafion ion exchange resin no. 12V6C1 diaphragm (see Table II). Two reference electrodes extended through wall portions of the lucite container were electrically connected by the electrolyte to the anode and cathode compartments at positions substantially adjacent to the respective electrode. The cells were charged and discharged by well-known means with the results shown in Table II.

TABLE I

| Electrolyte System | Catholyte (gm/liter) LiBr | Catholyte (gm/liter) ZnBr$_2$ | ZnCl$_2$ | Zn(BF$_4$)$_2$ | Anolyte (gm/liter) NH$_4$Cl | Anolyte (gm/liter) NH$_4$BF$_4$ | LiCl | pH | Filtered | Other |
|---|---|---|---|---|---|---|---|---|---|---|
| A |  | 240 |  | 144 | 33.7 | 44.9 |  | 4.9[1] | no |  |
| B |  | 300 |  | 374 | 33.7 | 44.9 |  | 6.0[1] | no |  |
| C |  | 300 |  | 144 |  |  | 27 | 3.5[2] | yes |  |
| D |  | 300[3] |  | 144 |  |  | 27 | 3.5[2] | yes |  |
| E | 695 |  |  | 144 |  |  | 25 | 3.5[2] | yes |  |
| F | 695 |  |  | 144 |  |  | 25 | 5.0[2] | yes |  |
| G | 695 |  |  | 144 |  |  | 254 | 5.0 | yes | [4] |
| H | 695 |  |  | 288 |  |  | 25 | 3.5[2] | yes |  |
| I | 695 |  |  | 432 |  |  | 25 | 2.0[2] | yes |  |
| J | 695 |  |  | 576 |  |  | 254 | —[7] | yes |  |
| K | 695 |  |  | 596 |  |  | 25 | 4.0[2] | yes |  |
| L | 695 |  |  | 596 |  |  | 224 | — | no |  |
| M | 695 |  | 545 |  |  |  | 109 | 3.58 | no | [6] |
| N | 695 |  | 750 |  |  |  |  | — | no |  |
| O | 695 |  | 1000 |  |  |  |  | 5.0 | no | [5] |
| P | 695 |  | 1154 |  |  |  | 212 | — | no |  |
| Q | 695 |  | 1500 |  |  |  | 109 | — | no |  |

[1]Acidity (pH) of the designated mixture was adjusted with a saturated aqueous NH$_4$OH solution.
[2]pH adjusted with LiOH particulate.
[3]Catholyte also included 142 gm/liter of a saturated aqueous CsBr solution.
[4]0.1 gm/liter gelatine.
[5]Triton CF10 surfactant added to anolyte.
[6]56 gm/liter LiOH; 3.6 gm/liter Triton CF10.
[7]pH adjusted with sufficient metallic zinc powder to maintain solid zinc powder in the mixture for about one hour.

TABLE II

| Example[1] | Electrolyte System | Cell Charged Amps | Cell Charged Volts[2] | Open Circuit Volts | Discharge (5 minute) Resistance (ohms) | Discharge (5 minute) Amps | Discharge (5 minute) Volts[2] | Electrode Anode | Electrode Cathode |
|---|---|---|---|---|---|---|---|---|---|
| 1 | A | 0.8 | 4.4 | 2.168 | short circuit | 0.40 | 0.9 | carbon | zinc |
| 2 | B | 0.8 | high |  |  |  |  | carbon | zinc |
| 3 | C | 0.5 | 2.2 | 1.810 | [3] | 0.50 | 1.26 | carbon | zinc |
| 4 | D | 0.5 | 2.25 | 1.770 | [3] | 0.50 | 0.80 | carbon | zinc |
| 5 | E | 0.24 | 2.25 | 1.834 | short circuit | 0.48 | 0.476 | carbon | zinc |
| 6 |  |  |  |  | 10 | 0.125 | 1.540 |  |  |
| 7 |  |  |  |  | 20 | 0.076 | 1.666 |  |  |
| 8 |  |  |  |  | 30 | 0.052 | 1.722 |  |  |
| 9 | F | 0.24 | 2.35 | 1.750 | short circuit | 0.410 | 0.055 | carbon | carbon |
| 10 |  |  |  |  | 10 | 0.100 | 1.250 |  |  |
| 11 |  |  |  |  | 20 | 0.060 | 1.420 |  |  |
| 12 |  |  |  |  | 30 | 0.050 | 1.650 |  |  |
| 13 | G | 0.24 | 2.30 | 1.930 | 30 | 0.058 | 1.760 | carbon | carbon |
| 14 | H | 0.24 | 2.35 | 1.806 | short circuit | 0.210 | 0.027 | carbon | carbon |
| 15 |  |  |  |  | 30 | 0.050 | 1.700 |  |  |
| 16 | I | 0.24 | 2.38 | 1.808 | short circuit | 0.440 | 0.280 | carbon | carbon |
| 17 |  |  |  |  | 10 | 0.105 | 1.316 |  |  |
| 18 |  |  |  |  | 20 | 0.065 | 1.524 |  |  |
| 19 |  |  |  |  | 30 | 0.048 | 1.624 |  |  |
| 20 | J | 0.24 | 3.4 | 1.65 | 30 | 0.036 | 1.150 | carbon | carbon |
| 21 | J | 0.24 | 5.5 | 1.62 | short circuit | 0.170 | 0.030 |  |  |
| 22 |  |  |  |  | 10 | 0.069 | 0.840 |  |  |
| 23 | K | 0.24 | 2.70 | 1.778 | 30 | 0.046 | 1.568 | carbon | zinc |
| 24 | L | 0.24 | 2.50 | 1.800 | short circuit | 0.390 | 0.085 | carbon | zinc |
| 25 |  |  |  |  | 10 | 0.100 | 1.414 |  |  |
| 26 |  |  |  |  | 20 | 0.050 | 1.638 |  |  |
| 27 |  |  |  |  | 30 | 0.038 | 1.638 |  |  |
| 28 | M | 0.24 | 10.2 | 1.780 | short circuit | 0.02 | 0.004 | carbon | zinc |
| 29 | N | 0.24 | 6.0 | 1.67 | short circuit | 0.180 | 0.050 | carbon | zinc |
| 30 |  |  |  |  | 10 | 0.074 | 0.890 |  |  |
| 31 |  |  |  |  | 20 | 0.050 | 1.120 |  |  |
| 32 |  |  |  |  | 30 | 0.040 | 1.230 |  |  |
| 33 | O | 0.24 | 2.31 | 1.740 | short circuit | [4] | [4] | carbon | zinc |
| 34 | P | 0.24 | 2.90 | 1.694 | short circuit | 0.050 | 0.036 | carbon | zinc |
| 35 |  |  |  |  | 10 | 0.043 | 0.476 |  |  |
| 36 |  |  |  |  | 20 | 0.038 | 0.874 |  |  |
| 37 |  |  |  |  | 30 | 0.036 | 1.120 |  |  |
| 38 | Q | 0.24 | 10.2 |  | short circuit | 0.02 | 0.004 | carbon | zinc |

[1]Distance between electrodes and electrode surface area: Examples 1 and 2: 0.25 inch and 8 square inches respectively; Examples 3 and 4: 1 inch and 6 square inches respectively; Examples 5–38: 0.2 inch and 2.4 square inches respectively.
[2]Voltage between cell anode and cathode and amperage during changing.
[3]Controlled at a discharge of 0.084 amp.
[4]Results appeared to be satisfactory.

What is claimed is:

1. A method of operating a zinc-bromide secondary cell divided into anode and cathode compartments by a zinc cation ion exchange diaphragm comprising adding a catholyte consisting essentially of an aqueous solution of at least one salt selected from the group consisting of ammonium bromide and the bromides of lithium, sodium, potassium, beryllium, magnesium, calcium and strontium to the cathode compartment with a cathode disposed therein; adding an anolyte consisting essentially of an essentially bromide ion free, aqueous solution containing at least one salt selected from the group consisting of zinc chlorate, zinc chloride, zinc iodide, zinc tetrafluoroborate, zinc fluorosilicate and zinc nitrate to the anode compartment with an anode disposed therein; impressing an electromotive force between the anode and the cathode to deposit metallic zinc on the anode, release bromine at the cathode and pass substantially only cations through the diaphragm into the anode compartment.

2. The method of claim 1 including adjusting the anolyte pH to within the range of from about 0.5 to about 5.

3. The method of claim 1 including adjusting the anolyte pH to within the range of from about 3 to about 4.

4. The method of claim 1 wherein the catholyte is at least about a one molar solution of a bromide ion.

5. The method of claim 1 wherein the catholyte is at least about a four molar solution of a bromide ion.

6. The method of claim 1 wherein the catholyte is a saturated solution of the bromide salt.

7. The method of claim 1 wherein the bromide salt is present in an amount within the range of from about one mole per liter of solution to a saturated solution.

8. The method of claim 1 wherein the salt is lithium bromide.

9. The method of claim 1 wherein the anolyte is at least about a two molar solution of a zinc ion.

10. The method of claim 1 wherein the anolyte is at least about a two molar solution of the zinc salt.

11. The method of claim 1 wherein the zinc salt is selected from the group consisting of zinc chloride and zinc tetrafluoroborate.

12. The method of claim 9 wherein the anolyte contains a tetrafluoroborate ion.

13. The method of claim 9 wherein the anolyte contains an alkali chloride.

14. The method of claim 9 wherein the anolyte contains lithium chloride.

15. A zinc-bromine electrolytic cell comprising in combination an at least partially encasing body, a first electrode positioned in an anode compartment spaced apart from a second electrode positioned in a cathode compartment by a zinc cation ion exchange diaphragm adapted to minimize passage of bromide ions into the anode compartment, said diaphragm separating the anode compartment from the cathode compartment, and an electrolyte system at least at the time of initial cell operation consisting essentially of an aqueous solution containing at least one salt selected from the group consisting of ammonium bromide and the bromides of lithium, sodium, potassium, beryllium, mangesium, calcium and strontium disposed in the cathode compartment and an essentially bromide ion free, aqueous solution containing at least one salt selected from the group consisting of zinc chlorate, zinc chloride, zinc iodide, zinc tetrafluoroborate, zinc fluorosilicate and zinc nitrate disposed in the anode compartment.

16. A zinc-bromide secondary cell comprising in combination an at least partially encasing container, an anode positioned in an anode compartment spaced apart from a cathode positioned in a cathode compartment by a zinc cation ion exchange diaphragm adapted to substantially entirely prevent passage of bromide ions from the cathode compartment into the anode compartment, the diaphragm substantially entirely separating the anode compartment from the cathode compartment, and an electrolyte system at least at the time of initial operation consisting essentially of an aqueous solution of at least about a one molar solution of lithium bromide disposed in the cathode compartment and at least about a two molar zinc chloride, substantially bromide ion free, aqueous solution disposed in the anode compartment.

* * * * *

UNITED STATES PATENT OFFICE
CERTIFICATE OF CORRECTION

PATENT NO. : 3,929,506

DATED : December 30, 1975

INVENTOR(S) : James J. Leddy; Gerhard Gritzner

It is certified that error appears in the above-identified patent and that said Letters Patent are hereby corrected as shown below:

In the title, correct "Zinc-Bromide" to --Zinc-Bromine--.

Column 3, line 42, change "ZnClO$_3$)$_2$" to --Zn(ClO$_3$)$_2$--.

Table II, add footnote (2) after "Amps", third column.

Column 5, Claim 1, line 64, correct spelling of "zinc-bromide" to --zinc-bromine--.

Column 8, Claim 16, line 22, correct spelling of "zinc-bromide" to --zinc-bromine--.

Signed and Sealed this thirtieth Day of March 1976

[SEAL]

Attest:

RUTH C. MASON
Attesting Officer

C. MARSHALL DANN
Commissioner of Patents and Trademarks